United States Patent
Li et al.

(10) Patent No.: US 12,032,421 B2
(45) Date of Patent: Jul. 9, 2024

(54) VOICE WAKEUP METHOD AND DEVICE

(71) Applicant: HUAWEI TECHNOLOGIES CO., LTD., Guangdong (CN)

(72) Inventors: Chunjian Li, Shanghai (CN); Dong Shi, Singapore (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 80 days.

(21) Appl. No.: 17/921,310

(22) PCT Filed: Apr. 12, 2021

(86) PCT No.: PCT/CN2021/086404
§ 371 (c)(1),
(2) Date: Oct. 25, 2022

(87) PCT Pub. No.: WO2021/218600
PCT Pub. Date: Nov. 4, 2021

(65) Prior Publication Data
US 2023/0315176 A1    Oct. 5, 2023

(30) Foreign Application Priority Data
Apr. 28, 2020    (CN) .......................... 202010352298.8

(51) Int. Cl.
*G06F 1/26*    (2006.01)
*G10L 25/21*    (2013.01)
*G10L 25/78*    (2013.01)

(52) U.S. Cl.
CPC ............. *G06F 1/26* (2013.01); *G10L 25/21* (2013.01); *G10L 25/78* (2013.01)

(58) Field of Classification Search
CPC ..... G06F 1/32; G06F 9/44; G06F 1/26; G06F 1/12
See application file for complete search history.

(56) References Cited

U.S. PATENT DOCUMENTS

| | | | |
|---|---|---|---|
| 10,231,070 B2 * | 3/2019 | Yang | H04R 29/005 |
| 10,902,001 B1 * | 1/2021 | Rengasamy | H04M 1/271 |
| 2011/0058683 A1 | 3/2011 | Kosteva et al. | |
| 2011/0288860 A1 | 11/2011 | Schevciw et al. | |
| 2014/0012573 A1 | 1/2014 | Hung et al. | |

(Continued)

FOREIGN PATENT DOCUMENTS

| | | |
|---|---|---|
| CN | 102819009 A | 12/2012 |
| CN | 106775569 A | 5/2017 |

(Continued)

*Primary Examiner* — Keshab R Pandey
(74) *Attorney, Agent, or Firm* — HUAWEI TECHNOLOGIES CO., LTD.

(57) ABSTRACT

A speech wakeup method and device, and a readable storage medium are provided. The voice wakeup method includes: detecting voice signals that are input into at least two microphones and that meet a first condition; and determining, based on whether voice energy of the voice signals input into the at least two microphones meets a second condition, whether to wake up the electronic device; and if the second condition is met, waking up the electronic device; or if the second condition is not met, continuing to detect a voice signal input into the microphone. The electronic device can be woken up in a wakeup-keyword-free manner.

20 Claims, 4 Drawing Sheets

(56) References Cited

U.S. PATENT DOCUMENTS

| | | |
|---|---|---|
| 2015/0039310 A1 | 2/2015 | Clark et al. |
| 2015/0142426 A1 | 5/2015 | Song et al. |
| 2017/0243602 A1 | 8/2017 | Yang et al. |
| 2018/0268845 A1 | 9/2018 | Yeo et al. |

FOREIGN PATENT DOCUMENTS

| | | |
|---|---|---|
| CN | 108073381 A | 5/2018 |
| WO | 2020051841 A1 | 3/2020 |

* cited by examiner

VOICE WAKEUP METHOD AND DEVICE

CROSS-REFERENCE TO RELATED APPLICATIONS

This application is a national stage of International Application No. PCT/CN2021/086404, filed Apr. 12, 2021, which claims priority to Chinese Patent Application No. 202010352298.8, filed Apr. 28, 2020. Both of the aforementioned applications are hereby incorporated by reference in their entireties.

TECHNICAL FIELD

This application relates to the field of voice wakeup technologies, and in particular, to a voice wakeup method and device.

BACKGROUND

Voice wakeup is a function that an electronic device in a standby state receives a specific voice instruction sent by a user and enters a working state or completes an operation. Currently, various electronic devices generally have a voice wakeup function. For example, a smartphone, a wearable device, a vehicle-mounted device, and a smart home device may be woken up through voice. In a current voice wakeup manner, wakeup is mainly performed by using a wakeup keyword. When the electronic device detects that a voice input by the user includes a specific keyword, the device is started to enter a subsequent processing procedure. A main disadvantage of the current voice wakeup solution is that a specific wakeup keyword needs to be input first through voice each time the user interacts with the electronic device. In an actual scenario, most users do not expect to first input a specific wakeup keyword each time the user has a dialogue with the electronic device. For example, a device name needs to be first input each time the device is to be woken up. In this manner, a dialogue and interaction process is complex, and human-computer dialogue experience is reduced.

SUMMARY

This application provides a voice wakeup method and device, to wake up an electronic device in a wakeup-keyword-free manner.

According to a first aspect, this technical solution provides a voice wakeup method, applied to an electronic device having a microphone, and in particular, applied to an electronic device having at least two microphones. The method includes: detecting voice signals that are input into the at least two microphones and that meet a first condition; and determining, based on whether voice energy of the voice signals input into the at least two microphones meets a second condition, whether to wake up the electronic device; and if the second condition is met, waking up the electronic device; or if the second condition is not met, continuing to detect a voice signal input into the microphone.

In the voice wakeup method provided in the foregoing technical solution, the voice signals input into the at least two microphones are received. When the voice signals input into the at least two microphones meet the first condition, the electronic device is woken up based on the voice energy of the at least two voice signals. In this manner, a user can wake up the electronic device without inputting a specific wakeup keyword through voice. In a possible manner, the user may wake up the electronic device by inputting a voice that is not explicitly indicated. In another possible manner, the user may directly input a voice instruction, for example, "play a song" or "call A". In this manner, on the basis of waking up the electronic device, the electronic device may be controlled to execute the corresponding voice instruction.

With reference to the first aspect, in some implementations of the first aspect, locations of the at least two microphones are distributed in different areas of the electronic device. In this manner, voice signals input into microphones located in different areas of the electronic device are obtained. Voice energy of the voice signals input into the microphones in different areas may be used to control the electronic device to be woken up.

In this implementation, a manner of determining whether the locations of the at least two microphones are distributed in different areas of the electronic device may include: grouping microphones included in the electronic device into different groups based on specific locations of the microphones; and determining, based on an identifier of a group to which the microphone belongs, whether the at least two microphones are located in different areas of the electronic device. For a specific electronic device such as a mobile phone, microphones of the mobile phone are grouped based on locations of the microphones of the mobile phone. In a grouping manner, a top microphone and a back microphone of the mobile phone are grouped into a first group, and a bottom microphone of the mobile phone is grouped into a second group. If the microphones into which the voice signals are input are separately from the first group and the second group, it is determined that the at least two microphones are distributed in different areas of the electronic device. Specifically, identifiers of the microphones may be first obtained, and groups of the microphones are determined based on the identifiers of the microphones. If the groups are different, it indicates that the microphones correspond to different areas of the electronic device.

With reference to the first aspect, in some implementations of the first aspect, determining whether the voice signals input into the microphones meet the first condition includes: calculating the voice energy of the voice signals input into the at least two microphones; and if the voice energy is greater than a first threshold, determining that the voice signals input into the at least two microphones meet the first condition. In other words, when a voice signal whose voice energy is greater than the first threshold is input into a microphone, it is determined that the voice signal input into the microphone meets the first condition.

In the solution of this embodiment of this application, an execution sequence of determining whether the voice signal meets the first condition and determining whether the microphones are distributed in different areas may be set based on an actual requirement. In a possible design, it is first determined whether the microphones into which the voice signals are input are distributed in different areas of the electronic device. If the microphones into which the voice signals are input are distributed in different areas of the electronic device, it is further determined whether the voice energy of the voice signals input into the microphones is greater than the first threshold. In addition, when voice signals are input into a plurality of microphones that belong to a same area, only one microphone that belongs to the area may be selected to perform determining based on the first condition. In another possible design, it is first determined whether the voice energy of the voice signals input into the microphones is greater than the first threshold. When the voice energy of the voice signals input into the at least two microphones is greater than the first threshold, it is further determined whether the locations of the at least two microphones are distributed in different areas of the electronic device.

With reference to the first aspect, in some implementations of the first aspect, a manner of calculating the voice energy of the voice signals input into the microphones may be: sampling a voice signal, and calculating the voice energy of the voice signals by calculating voice energy of the sampled signal. The manner is specifically: obtaining a first voice signal with first duration from the voice signals input into the microphones, then sampling the first voice signal based on a specified sampling frequency, and calculating, based on the sampled signal, the voice energy of the voice signals input into the microphones. For example, timing starts from a start moment at which the voice signals are input into the microphones, a voice signal with the first duration such as 20 milliseconds is obtained, and then the obtained voice signal is sampled based on the specified sampling frequency such as 16 kHz.

With reference to the first aspect, in some implementations of the first aspect, the calculating, based on the sampled signal, the voice energy of the voice signals input into the at least two microphones includes: calculating an energy value of each sampling value included in the sampled signal, and determining an average value of the energy values of the sampling values as the voice energy of the voice signals input into the at least two microphones.

With reference to the first aspect, in some implementations of the first aspect, determining whether the voice energy of the voice signals input into the at least two microphones meets the second condition includes: determining, based on an energy value difference between the voice signals, whether the voice energy of the voice signals input into the at least two microphones meets the second condition; or determining, based on an energy value ratio between the voice signals, whether the voice energy of the voice signals input into the at least two microphones meets the second condition.

With reference to the first aspect, in some implementations of the first aspect, the determining, based on an energy value difference between the voice signals, whether the voice energy of the voice signals input into the at least two microphones meets the second condition includes: if an energy value difference between a voice signal input into one of the at least two microphones and a voice signal input into a remaining microphone is greater than a second threshold, determining that the voice energy of the voice signals input into the at least two microphones meets the second condition.

With reference to the first aspect, in some implementations of the first aspect, the determining, based on an energy value ratio between the voice signals, whether the voice energy of the voice signals input into the at least two microphones meets the second condition includes: if an energy value ratio between a voice signal input into one of the at least two microphones and a voice signal input into a remaining microphone is greater than a third threshold, determining that the voice energy of the voice signals input into the at least two microphones meets the second condition.

According to a second aspect, this technical solution provides a voice wakeup device, including: a voice detection unit, configured to detect voice signals that are input into at least two microphones and that meet a first condition; and a wakeup unit, configured to: determine, based on whether voice energy of the voice signals input into the at least two microphones meets a second condition, whether to wake up the electronic device; and if the voice energy meets the second condition, wake up the electronic device; or otherwise, continue to detect a voice signal by using the voice detection unit.

With reference to the second aspect, in some implementations of the second aspect, locations of the at least two microphones are distributed in different areas of the electronic device.

With reference to the second aspect, in some implementations of the second aspect, the voice detection unit is specifically configured to: calculate the voice energy of the voice signals input into the at least two microphones; and if the voice energy is greater than a first threshold, determine that the voice signals input into the at least two microphones meet the first condition.

With reference to the second aspect, in some implementations of the second aspect, the voice detection unit is specifically configured to: obtain a first voice signal with first duration from the voice signals input into the at least two microphones, sample the first voice signal based on a specified sampling frequency, and calculate, based on the sampled signal, the voice energy of the voice signals input into the at least two microphones.

With reference to the second aspect, in some implementations of the second aspect, the voice detection unit is specifically configured to: calculate an energy value of each sampling value included in the sampled signal, and determine an average value of the energy values of the sampling values as the voice energy of the voice signals input into the at least two microphones.

With reference to the second aspect, in some implementations of the second aspect, the wakeup unit is specifically configured to: determine, based on an energy value difference between the voice signals, whether the voice energy of the voice signals input into the at least two microphones meets the second condition; or determine, based on an energy value ratio between the voice signals, whether the voice energy of the voice signals input into the at least two microphones meets the second condition.

With reference to the second aspect, in some implementations of the second aspect, the wakeup unit is specifically configured to: if an energy value difference between a voice signal input into one of the at least two microphones and a voice signal input into a remaining microphone is greater than a second threshold, determine that the voice energy of the voice signals input into the at least two microphones meets the second condition.

With reference to the second aspect, in some implementations of the second aspect, the wakeup unit is specifically configured to: if an energy value ratio between a voice signal input into one of the at least two microphones and a voice signal input into a remaining microphone is greater than a third threshold, determine that the voice energy of the voice signals input into the at least two microphones meets the second condition.

According to a third aspect, this technical solution provides a voice wakeup device, including microphones, one or more processors, a memory, and one or more computer programs. The one or more computer programs are stored in the memory. The one or more computer programs include instructions. When the instructions are executed by the device, the device is enabled to perform the following steps: detecting voice signals that are input into at least two microphones and that meet a first condition; and determining, based on whether voice energy of the voice signals input into the at least two microphones meets a second condition, whether to wake up the electronic device; and if the second condition is met, waking up the electronic device; or if the second condition is not met, continuing to detect a voice signal.

According to a fourth aspect, this technical solution provides a voice wakeup device, where the device includes a storage medium and a central processing unit, the storage medium may be a non-volatile storage medium, the storage medium stores a computer executable program, and the central processing unit is connected to the non-volatile storage medium, and executes the computer executable program to implement the method in any one of the first aspect or the possible implementations of the first aspect.

According to a fifth aspect, this technical solution provides a chip, where the chip includes a processor and a data interface, and the processor reads, through the data interface, instructions stored in a memory, to perform the method in any one of the first aspect or the possible implementations of the first aspect.

Optionally, in an implementation, the chip may further include a memory. The memory stores instructions. The processor is configured to execute the instructions stored in the memory. When executing the instructions, the processor is configured to perform the method in any one of the first aspect or the possible implementations of the first aspect.

According to a sixth aspect, this technical solution provides a computer-readable storage medium, where the computer-readable storage medium stores program code executed by a device, and the program code includes instructions used to perform the method in any one of the first aspect or the possible implementations of the first aspect.

DESCRIPTION OF EMBODIMENTS

The following describes technical solutions of this application with reference to the accompanying drawings.

As described in the background, currently, voice wakeup is mainly performed based on a keyword spotting (keyword spotting, KWS) technology. When detecting that a voice signal input by a user includes a specified keyword, an electronic device is woken up, and enters a subsequent possible procedure. An interaction process in this voice wakeup solution is complex, and is significantly different from a real human-to-human dialogue. As a result, human-computer dialogue experience of the user is reduced. Therefore, a voice wakeup method is required to simplify a voice wakeup procedure of the electronic device.

Embodiments of this application provide a voice wakeup method, applied to an electronic device having a microphone, and in particular, applied to an electronic device having at least two microphones. When a user expects to wake up the electronic device, the user may input any voice into the electronic device. The electronic device detects a voice signal input by the user, and determines whether each voice signal meets a specified energy difference condition. If the specified energy difference condition is met, the electronic device is woken up. In this manner, the voice signal used to wake up the electronic device does not need to include a specific keyword, so that the electronic device is woken up in a wakeup-keyword-free manner.

The voice wakeup method in the embodiments of this application may be applied to an electronic device such as a mobile phone, a wearable device, a vehicle-mounted device, a smart home device, or an augmented reality (augmented reality, AR) device/a virtual reality (virtual reality, VR) device. A specific type of the electronic device is not limited in the embodiments of this application.

Figure 1:
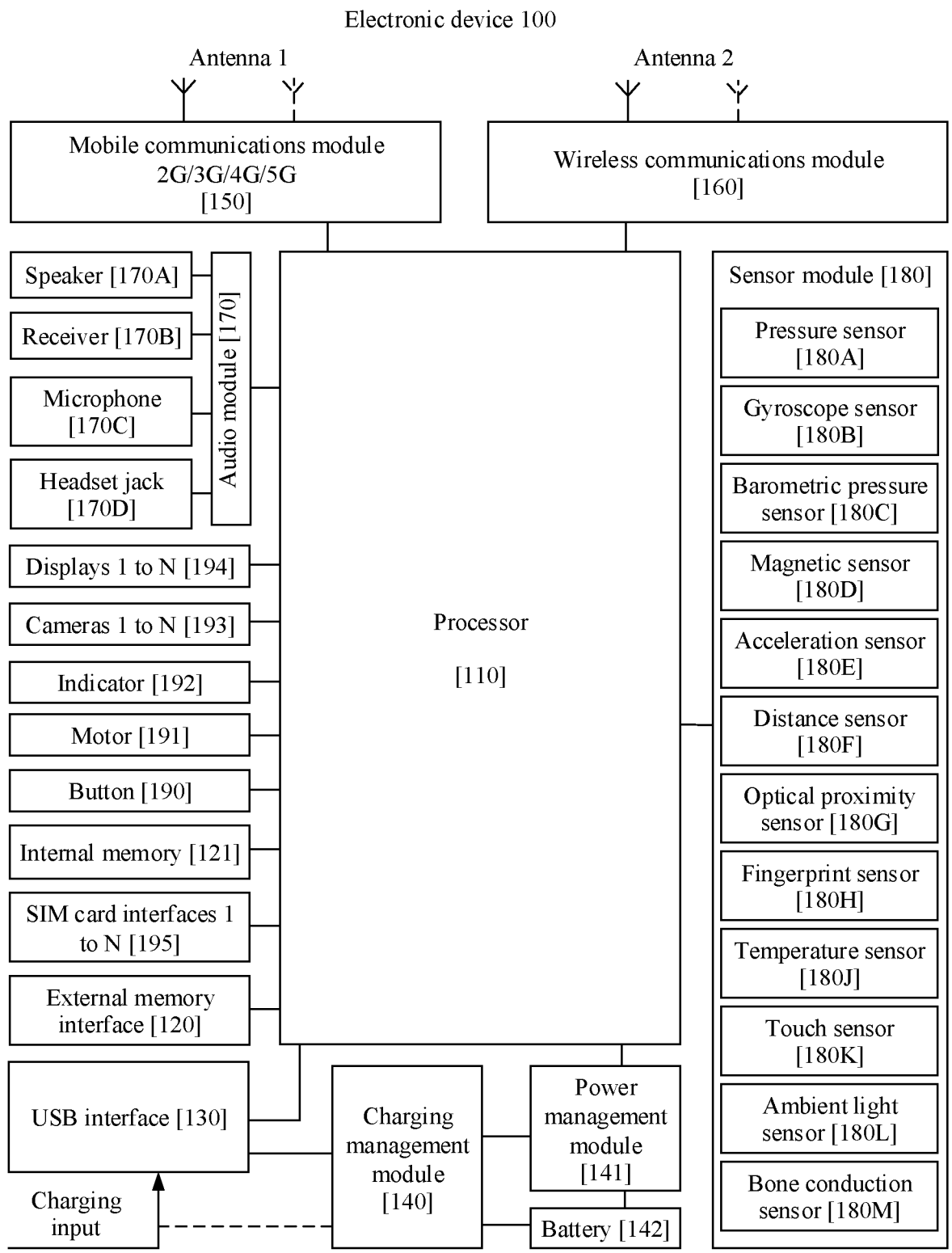
FIG. 1 is a schematic diagram of a structure of an electronic device according to an embodiment of this application.

For example, FIG. 1 is a schematic diagram of a structure of an electronic device 100 according to an embodiment of this application. The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. Optionally, there are a plurality of microphones 170C. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in embodiments of this application does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent devices, or may be integrated into one or more processors.

The controller may be a nerve center and a command center of the electronic device 100. The controller may generate an operation control signal based on an instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data that has been used or is cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identification module (subscriber identity module, SIM) interface, a universal serial bus (universal serial bus, USB) interface, and/or the like.

The I2S interface may be used for audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call by using a Bluetooth headset.

The PCM interface may also be used for audio communication, and analog signal sampling, quantization, and coding. In some embodiments, the audio module 170 may be coupled to the wireless communications module 160 through a PCM bus interface. In some embodiments, the audio module 170 may alternatively transmit an audio signal to the wireless communications module 160 through the PCM interface, to implement a function of answering a call by using a Bluetooth headset. Both the I2S interface and the PCM interface may be used for audio communication.

The UART interface is a universal serial data bus, and is used for asynchronous communication. The bus may be a two-way communications bus. The bus converts to-be-transmitted data between serial communication and parallel communication. In some embodiments, the UART interface is usually used to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music by using a Bluetooth headset.

The GPIO interface may be configured by using software. The GPIO interface may be configured as a control signal, or may be configured as a data signal. In some embodiments, the GPIO interface may be configured to connect the processor 110 to the camera 193, the display 194, the wireless communications module 160, the audio module 170, the sensor module 180, or the like. The GPIO interface may be further configured as the I2C interface, the I2S interface, the UART interface, the MIPI interface, or the like.

It may be understood that an interface connection relationship between the modules that is shown in embodiments of this application is merely an example for description, and does not constitute a limitation on a structure of the electronic device 100. In some other embodiments of this application, the electronic device 100 may alternatively use an interface connection manner different from that in the foregoing embodiment, or use a combination of a plurality of interface connection manners.

The internal memory 121 may be configured to store computer-executable program code. The executable program code includes instructions. The internal memory 121 may include a program storage area and a data storage area. The program storage area may store an operating system, an application required by at least one function (for example, a sound playing function or an image playing function), and the like. The data storage area may store data (such as audio data and an address book) and the like that are created during use of the electronic device 100. In addition, the internal memory 121 may include a high-speed random access memory, and may further include a nonvolatile memory, for example, at least one magnetic disk storage device, a flash memory device, or a universal flash storage (universal flash storage, UFS). The processor 110 runs instructions stored in the internal memory 121 and/or instructions stored in the memory disposed in the processor, to perform various function applications and data processing of the electronic device 100.

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to: code and decode an audio signal. In some embodiments, the audio module 170 may be disposed in the processor 110, or some functional modules of the audio module 170 are disposed in the processor 110.

The microphone 170C, also referred to as a "mike" or a "mic", is configured to convert a sound signal into an electrical signal. When making a call or sending speech information, a user may place the mouth of the user near the microphone 170C to make a sound, to input a sound signal to the microphone 170C. At least one microphone 170C may be disposed in the electronic device 100. In some other embodiments, two microphones 170C may be disposed in the electronic device 100, to collect a sound signal and further implement a noise reduction function. In some other embodiments, three, four, or more microphones 170C may alternatively be disposed in the electronic device 100, to collect a sound signal, implement noise reduction, and identify a sound source, to implement a directional recording function and the like.

For example, the electronic device to which the voice wakeup method in this application is applied may include two, three, four, or more microphones 170C. The microphone 170C collects a voice signal input by a user, and sends the voice signal to the audio module 170. The voice signal is sent to the processor 110 by using the audio module 170. The processor 110 processes the voice signal to implement the voice wakeup method in the embodiments of this application.

A software system of the electronic device 100 may use a layered architecture, an event-driven architecture, a microkernel architecture, a micro service architecture, or a cloud architecture. In embodiments of the present invention, an Android system of a layered architecture is used as an example to illustrate the software structure of the electronic device 100.

Figure 2:
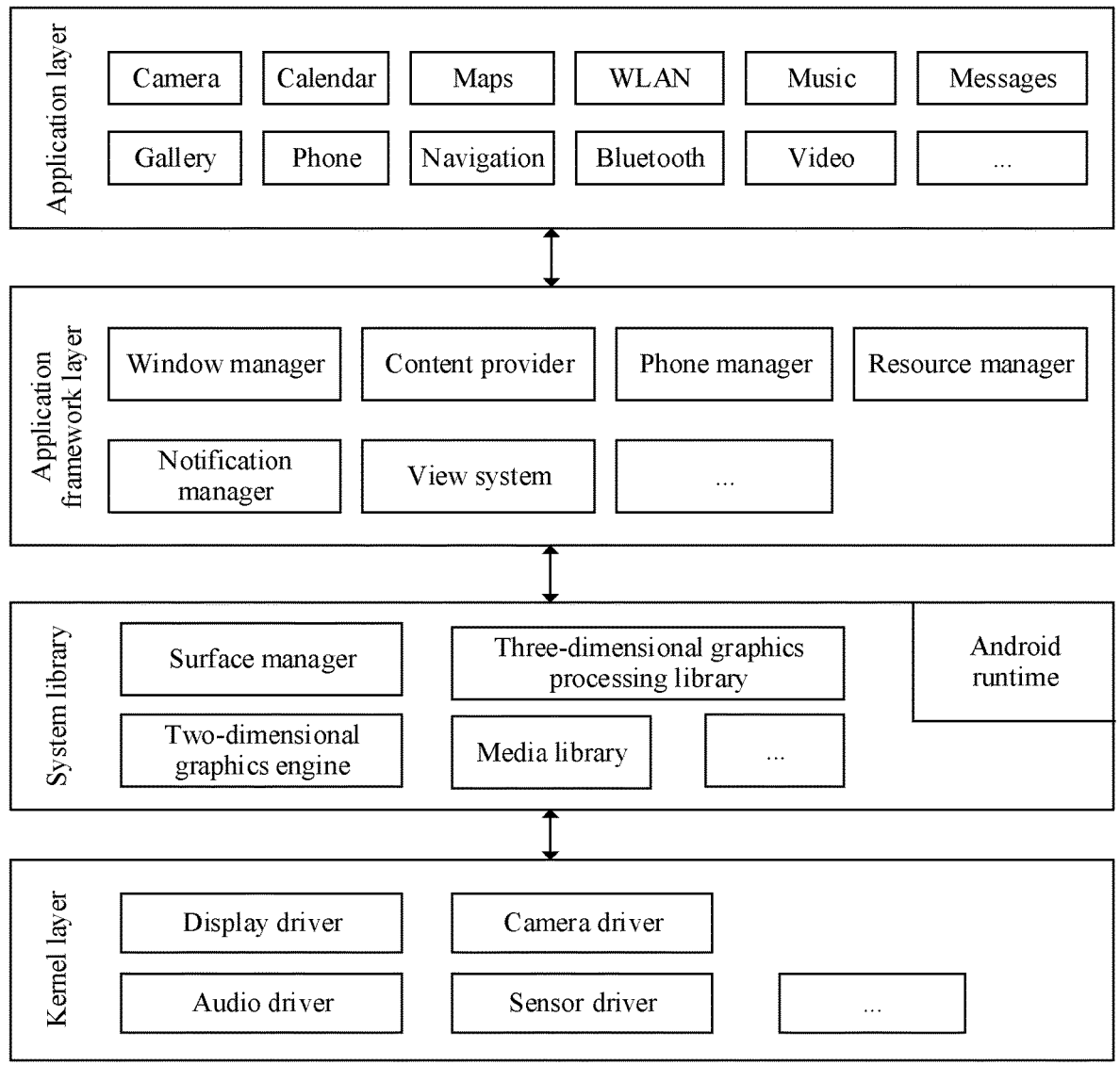
FIG. 2 is a block diagram of a software structure of an electronic device according to an embodiment of this application.

FIG. 2 is a block diagram of a software structure of an electronic device 100 according to an embodiment of this application. In a layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom. The application layer may include a series of application packages.

As shown in FIG. 2, the application packages may include applications such as Camera, Gallery, Calendar, Phone, Maps, Navigation, Wireless local area network (wireless local area networks, WLAN), Bluetooth, Music, Video, and Messages.

The application framework layer provides an application programming interface (application programming interface, API) and a programming framework for an application at the application layer. The application framework layer includes some predefined functions.

For example, in this application, a voice wakeup function or algorithm and a voice recognition algorithm may be included at the application framework layer.

As shown in FIG. 2, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like.

The content provider is configured to store and obtain data, and enable the data to be accessed by an application. The data may include a video, an image, audio, calls that are made and received, a browsing history and bookmarks, a phone book, and the like.

The Android runtime includes a kernel library and a virtual machine. The Android runtime is responsible for scheduling and management of the Android system.

The kernel library includes two parts: a function that needs to be called in Java language, and a kernel library of Android.

The application layer and the application framework layer run on a virtual machine. The virtual machine executes Java files at the application layer and the application framework layer as binary files. The virtual machine is configured to perform functions such as object lifecycle management, stack management, thread management, security and exception management, and garbage collection.

The system library may include a plurality of functional modules, for example, a surface manager (surface manager), a media library (Media Libraries), a three-dimensional graphics processing library (for example, OpenGL ES), and a 2D graphics engine (for example, SGL).

The kernel layer is a layer between hardware and software. The kernel layer includes at least a display driver, a camera driver, an audio driver, and a sensor driver.

For ease of understanding, with reference to the accompanying drawings, based on an application scenario, the voice wakeup method provided in the embodiments of this application is specifically described in the following embodiments of this application by using an electronic device with the structures shown in FIG. 1 and FIG. 2 as an example.

When the electronic device is in a standby state, to implement voice wakeup on the electronic device in a wakeup-keyword-free manner, this application provides a technology for performing voice wakeup based on energy of a voice signal. When a voice signal collected by a microphone meets a specified voice energy requirement, the electronic device is automatically woken up, and the user does not need to input a specific wakeup keyword through voice.

Figure 3:
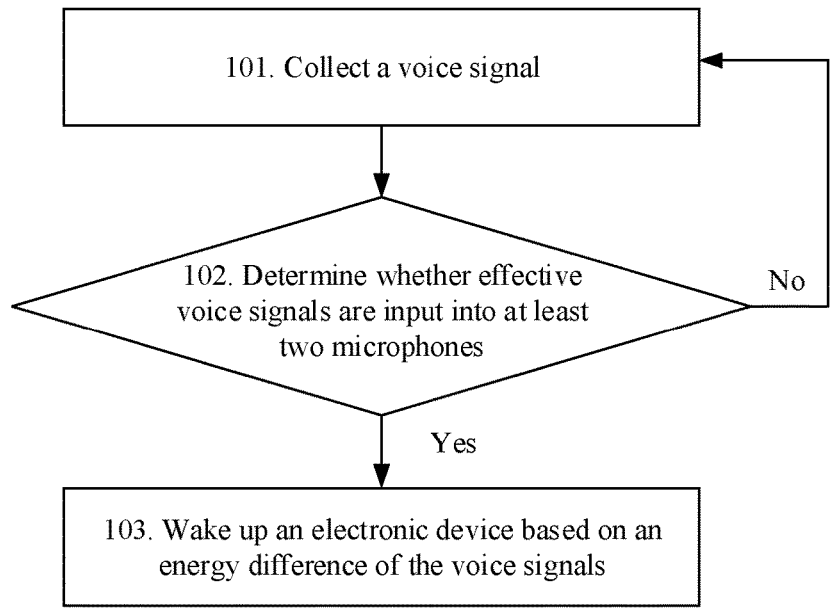
FIG. 3 is a schematic flowchart of a voice wakeup method according to an embodiment of this application.

FIG. 3 is a schematic flowchart of a voice wakeup method according to an embodiment of this application. In this application, a mobile phone is used as an electronic device to describe in detail the voice wakeup method provided in this application.

101. Collect a voice signal.

In a screen-off state and a screen locked state, the mobile phone is in a standby state. In this state, a microphone and a voice activity detection (Voice Activity Detection, VAD) module in the mobile phone remain enabled. When a user sends a voice, the microphone collects the voice sent by the user, and converts a sound signal into an electronic voice signal. The microphone sends, to the voice activity detection module, the electronic voice signal obtained through conversion, and the voice activity detection module processes the electronic voice signal.

The voice activity detection module is configured to process the voice signal to implement the voice wakeup method in this embodiment of this application. The voice activity detection module may be specifically implemented in a form of hardware or a combination of hardware and computer software. In a possible manner, the voice activity detection module may run based on a processor. When the mobile phone is in a standby state, the processor maintains a low-power running mode, for example, maintains a sleep mode. In this mode, the voice activity detection module maintains enabled, and when detecting a voice signal that meets a wakeup requirement, sends a wakeup signal to the processor. In another possible manner, the processor includes a controller and a voice processor, and the voice processor may be, for example, a DSP. When the mobile phone is in a standby state, the controller maintains a low-power mode, and the voice activity detection module remains enabled in the voice processor. When detecting a voice signal that meets a wakeup requirement, the voice activity detection module sends a wakeup signal to the controller.

102. Determine whether effective voice signals are input into at least two microphones; and if effective voice signals are input into at least two microphones, perform step 103; or otherwise, the voice activity detection module continues to monitor whether a voice signal is input into the microphone.

Generally, when the user sends a voice, each microphone of the mobile phone can collect a voice signal. The voice activity detection module obtains a voice signal input into each microphone. The voice activity detection module determines, from the obtained voice signals, whether effective sound signals are input into at least two microphones. If effective voice signals are input into at least two microphones, the voice activity detection module further determines whether energy of the at least two voice signals meets a wakeup condition. Otherwise, the voice activity detection module continues to monitor whether a voice signal is input into the microphone, and does not perform determining based on the wakeup condition in a next step. In an example, the mobile phone includes two microphones. When the user sends a voice, the two microphones each send a voice signal to the voice activity detection module, and the voice activity detection module determines whether the voice signals collected by the two microphones are effective voice signals. For another example, the mobile phone includes three microphones. When the user sends a voice, the three microphones each send a voice signal to the voice activity detection module, and the voice activity detection module determines whether the voice signals collected by the three microphones are effective voice signals, or determines whether two voice signals in the three voice signals are effective voice signals. Similarly, when the mobile phone includes four or more microphones, each microphone sends a voice signal to the voice activity detection module, and the voice activity detection module determines whether each voice signal is an effective voice signal or whether a quantity of effective voice signals exceeds two. Optionally, when the quantity of effective voice signals exceeds three, a predetermined quantity of voice signals may be selected to perform step 103, for example, two, three, or another quantity of voice signals are selected from the effective voice signals to perform step 103 for processing in a subsequent step.

In this embodiment of this application, the voice activity detection module may determine, based on voice energy, whether a received voice signal is an effective voice signal, that is, determine, by using determining on the voice energy as a first condition, whether the voice signal is effective. Optionally, when determining that the voice energy of the received voice signal is greater than a first threshold, the voice activity detection module determines that the voice signal input into the microphone is effective. In an example, a value of the first threshold is a 20 dB sound pressure level, and when voice energy of a detected voice signal is greater than the 20 dB sound pressure level, the voice activity detection module determines that the voice signal is effective. After it is detected that voice signals that meet the first condition are input into at least two microphones of the mobile phone, step 103 is performed.

103. Wake up the electronic device based on energy of the voice signals.

After detecting that voice signals that meet the first condition are input into the at least two microphones of the mobile phone, the voice activity detection module determines, based on the voice energy of the at least two voice signals, whether to wake up the electronic device. The voice activity detection module may determine, based on a relationship between the voice energy of the at least two voice signals, whether to wake up the electronic device. In an optional manner, if the relationship between the voice energy of the at least two voice signals meets a specified second condition, the electronic device is woken up. The relationship between the voice energy of the at least two voice signals may be an energy value difference, an energy value ratio, or another possible relationship between the energy. This is not limited in this embodiment of this application. Specifically, if the energy value difference or the energy value ratio between the at least two voice signals meets the second condition, the electronic device is woken up.

That the energy value difference between the at least two voice signals meets the second condition includes: If an energy value difference between a voice signal input into one of the at least two microphones and a voice signal input into a remaining microphone is greater than a second threshold, it is determined that the voice energy of the voice signals input into the at least two microphones meets the second condition. The second threshold may be set as required, for example, set to a 40 dB sound pressure level. In an example, the mobile phone includes a top microphone and a bottom microphone. When the user speaks to the top microphone, voice energy of a voice signal input into the top microphone is significantly higher than voice energy of a voice signal input into the bottom microphone. If an energy value difference between the voice signal input into the top microphone and the voice signal input into the bottom microphone is greater than the second threshold, for example, is greater than the 40 dB sound pressure level, the electronic device is woken up.

In another possible manner, if an energy value ratio between a voice signal input into one of the at least two microphones and a voice signal input into a remaining microphone is greater than a third threshold, it is determined that the voice energy of the voice signals input into the at least two microphones meets the second condition. The third threshold may be set as required, for example, set to 3. In an example, the mobile phone includes a top microphone and a bottom microphone. When the user speaks to the top microphone, voice energy of a voice signal input into the top microphone is significantly higher than voice energy of a voice signal input into the bottom microphone. If a ratio of an energy value of the voice signal input into the top microphone to an energy value of the voice signal input into the bottom microphone is greater than the third threshold, for example, is greater than 3, the electronic device is woken up.

In this application, the electronic device is woken up based on the energy of the voice signals. In this manner, a voice input by the user does not need to include a specific wakeup keyword. In a possible manner, the user may wake up the electronic device by inputting a voice that is not explicitly indicated, for example, "uh", "er", or "um". After the electronic device is woken up based on the voice that is not explicitly indicated, the electronic device may be switched from a standby mode to a normal running mode, for example, a screen is lit up. In another possible manner, the user may directly input a voice instruction, for example, "play a song", "call A", "weather forecast", or "navigate to B". When the voice signal input by the user includes the voice instruction, on the basis of waking up the electronic device, the electronic device may be controlled to execute the voice instruction. For example, a voice assistant application is started after the electronic device is woken up by using the voice signal. The voice assistant recognizes the voice instruction in the voice signal, and executes the voice instruction. The voice instruction may include, for example, "play a song", "search for a telephone number of A and dial the number", "query a local weather forecast and broadcast or display the weather forecast", and "display a route navigated from a current location to B". It may be learned that, in the voice wakeup method in this embodiment of this application, the user may wake up the electronic device by using any voice whose voice energy meets the second condition. In addition, in the method in this embodiment of this application, the electronic device is woken up. In addition, human-computer interaction may be directly performed with the electronic device by using the voice instruction. This more complies with a human-computer voice interaction scenario, and improves human-computer interaction experience of the user.

Figure 4:
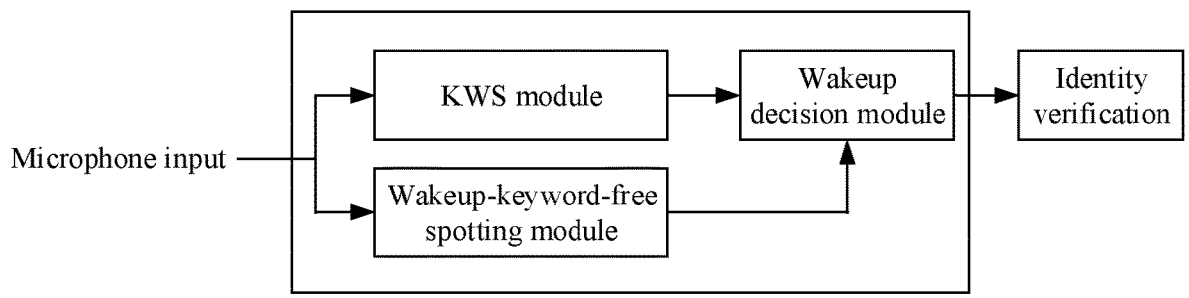
FIG. 4 is another schematic flowchart of a voice wakeup method according to an embodiment of this application.

FIG. 4 is another schematic flowchart of a voice wakeup method according to an embodiment of this application. As shown in FIG. 4, the method includes a keyword spotting (KWS) module and a wakeup-keyword-free spotting module. The wakeup-keyword-free spotting module implements a same function as the voice activity detection module in the foregoing embodiment. After detecting a voice signal, a microphone separately sends the voice signal as an input signal to the keyword spotting module and the wakeup-keyword-free spotting module. The keyword spotting module performs keyword recognition on the voice signal. If the voice signal includes a specific keyword, the keyword spotting module outputs an indication value used to indicate to wake up an electronic device. The indication value may be set as required. For example, when the indication value is output as "1", it indicates that the electronic device is to be woken up; or when the indication value is output as "0", the electronic device is not to be woken up. After receiving the voice signal, the wakeup-keyword-free spotting module performs wakeup-keyword-free determining on the voice signal based on the method provided in this embodiment of this application. If determining, based on a result of the wakeup-keyword-free determining, that a wakeup condition is met, the wakeup-keyword free detection module outputs an indication value used to indicate to wake up the electronic device. The indication value may be set as required. For example, when the indication value is output as "1", it indicates that the electronic device is to be woken up; or when the indication value is output as "0", the electronic device is not to be woken up. A wakeup decision module determines, based on outputs of the keyword spotting module and the wakeup-keyword-free spotting module, whether to wake up the electronic device. Optionally, when either the keyword spotting module or the wakeup-keyword-free spotting module outputs the indication value used to indicate to wake up the electronic device, the electronic device is to be woken up. Specifically, the wakeup decision module may be implemented by using logic OR or a circuit OR.

It may be understood that, during specific implementation, the keyword spotting module and the wakeup-keyword-free spotting module may be enabled based on a personalized setting of a user. For example, based on a setting of the user, only the keyword spotting module may be enabled, only the wakeup-keyword-free spotting module may be enabled, or both detection modules may maintain enabled. Further, after the electronic device is woken up based on the wakeup-keyword-free spotting module and/or the keyword spotting module, voiceprint detection or face detection may be performed. Voiceprint detection and face detection are used to verify an identity of the user, that is, verify whether a current user is an authorized user of a mobile phone. The wakeup-keyword-free voice wakeup method in this embodiment of this application may be used to unlock the mobile phone. Specifically, after the electronic device is woken up in a wakeup-keyword-free manner, voiceprint recognition is automatically performed on a voice signal input by the user. After verifying that the current user is an authorized user based on voiceprint recognition, the mobile phone is automatically unlocked. In this way, the electronic device is unlocked through sound control, that is, the electronic device is unlocked in a contactless manner.

In the wakeup-keyword-free voice wakeup method in this embodiment of this application, the electronic device is woken up based on voice energy of at least two voice signals. The method may be applied to a scenario in which the electronic device is woken up in the near field, and in particular, to a scenario in which a near field user sends a voice to the electronic device in a specific posture. For example, when the user picks up the mobile phone and speaks to a top microphone or a bottom microphone of the mobile phone, the top microphone and the bottom microphone of the mobile phone each collect a voice signal that meets the foregoing first condition. When the user speaks to the top of the mobile phone, voice energy of the voice signal collected by the top microphone is significantly higher than voice energy of the voice signal collected by the bottom microphone. Similarly, when the user speaks to the bottom of the mobile phone, voice energy of the voice signal collected by the bottom microphone is significantly higher than voice energy of the voice signal collected by the top microphone. In the wakeup-keyword-free voice wakeup method in this embodiment of this application, it is determined, based on voice energy of a voice signal collected by each microphone of the mobile phone in the near field scenario, whether to wake up the electronic device. In the method in this embodiment of this application, the electronic device can be woken up in a wakeup-keyword-free manner, and an ineffective voice signal in a noisy environment can be automatically filtered out, for example, sound made by a person at a distance from the mobile phone. Locations of the microphones of the mobile phone relative to a sound source are basically the same. The voice energy of the voice signal collected by each microphone of the mobile phone is difficult to meet the second condition. As a result, the mobile phone cannot be automatically woken up. It may be learned that, in the method in this embodiment of this application, the second condition for performing determining on the energy of the voice signal is set, so that an ineffective voice signal in surroundings can be automatically shielded.

In this application, a speaking posture of a speaker in the near field may be determined based on the voice energy of the voice signals input into the at least two microphones. In an example, area division is performed on the electronic device. The microphone belongs to a corresponding area based on a location on the electronic device. For example, the mobile phone is divided into a top area and a bottom area by using a screen middle line as a boundary. If voice energy of a voice signal collected by a microphone in the top area is greater than voice energy of a voice signal collected by a microphone in the bottom area, and a voice energy difference or ratio meets the second condition, it may be determined that the user speaks to the top microphone. In this manner, it may also be determined whether the user speaks to the microphone in the bottom area. Based on a correspondence between a voice signal and a user posture, in this method, before determining is performed on the voice energy, it may be determined whether the microphones into which the voice signals are input belong to different areas of the electronic device. If the microphones into which the voice signals are input belong to different areas of the electronic device, further determining is performed on the voice energy. In another possible manner, at least two microphones that belong to different areas of the electronic device may be selected from the microphones into which the voice signals are input, to perform subsequent determining on the voice energy.

In the solution of this embodiment of this application, a manner of determining whether locations of the at least two microphones belong to different areas of the electronic device may be: grouping microphones included in the electronic device into different groups based on specific locations of the microphones; and determining, based on an identifier of a group to which the microphone belongs, whether the at least two microphones belong to different areas of the electronic device. For a specific electronic device such as a mobile phone, microphones of the mobile phone are grouped based on locations of the microphones of the mobile phone. In a grouping manner, a top microphone and a back microphone of the mobile phone are grouped into a first group, and a bottom microphone of the mobile phone is grouped into a second group. If the microphones into which the voice signals are input are separately from the first group and the second group, it is determined that the at least two microphones belong to different areas of the electronic device. Specifically, groups of the microphones into which the voice signals are input may be determined based on identifiers of the microphones. If the groups are different, it indicates that the microphones correspond to different areas of the electronic device. For example, identifiers of two microphones into which voice signals are input are respectively T-mic and B-mic. It is determined, based on the identifier T-mic, that a microphone corresponding to T-mic belongs to the first group and corresponds to the top area of the mobile phone. It is determined, based on the identifier B-mic, that a microphone corresponding to B-mic belongs to the second group and corresponds to the bottom area of the mobile phone.

In the solution of this embodiment of this application, an execution sequence of determining whether the voice signal meets the first condition and determining whether the microphones belong to different areas may be set based on an actual requirement. In a possible design, it is first determined whether the microphones into which the voice signals are input belong to different areas of the electronic device. If the microphones into which the voice signals are input belong to different areas of the electronic device, it is further determined whether the voice energy of the voice signals input into the microphones is greater than the first threshold. In addition, when a same area includes a plurality of microphones, one microphone may be selected from the area to determine whether energy of a voice signal is greater than the first threshold. In another possible design, it is first determined whether the voice energy of the voice signals input into the microphones is greater than the first threshold. When the voice signals input into the at least two microphones is greater than the first threshold, it is further determined whether the at least two microphones belong to different areas of the electronic device. If the at least two microphones belong to different areas of the electronic device, it is further determined whether the voice energy of the at least two voice signals meets the second condition.

Figure 5:
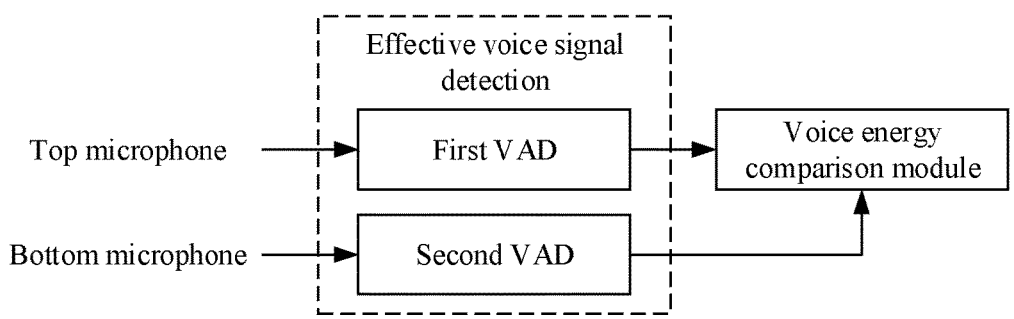
FIG. 5 is another schematic flowchart of a voice wakeup method according to an embodiment of this application.

FIG. 5 is another schematic flowchart of a voice wakeup method according to an embodiment of this application. In the method shown in FIG. 5, two microphones of a mobile phone are used as an example to describe a wakeup-keyword-free voice wakeup procedure. As shown in FIG. 5, the method includes two phases. A first phase is effective-voice-signal recognition, and a second phase is a voice energy comparison process.

Phase 1: Effective-Voice-Signal Detection

As shown in FIG. 5, the mobile phone includes a top microphone and a bottom microphone. After collecting a voice signal, the top microphone and the bottom microphone separately input the voice signal into respective corresponding voice activity detection submodules, namely, a first submodule (corresponding to a first VAD in FIG. 5) and a second submodule (corresponding to a second VAD in FIG. 5). The first submodule is configured to: calculate voice energy of the voice signal input into the top microphone, and determine whether the voice energy is greater than a first threshold. The second submodule is configured to: calculate voice energy of the voice signal input into the bottom microphone, and determine whether the voice energy is greater than the first threshold. If the voice energy of the voice signals in both the first submodule and the second submodule is greater than the first threshold, it indicates that the top microphone and the bottom microphone each collect an effective voice signal. In this case, the second phase is entered.

It is assumed that the voice signals input into the top microphone and the bottom microphone are respectively as follows:

$x_1(n), x_2(n), n=0,1,2,3 \ldots$ where n represents a sampling point of a digital signal. In this case, outputs of the first submodule and the second submodule may be as follows:

$$VAD(x) = \left\{ \begin{array}{ll} 1, & \text{if } E(x^2) > \text{THR\_vad} \\ 0, & \text{otherwise} \end{array} \right\}$$

where $E(x^2)$ represents the voice energy of the voice signal, and THR_vad is a preset value. If the voice energy of the two voice signals is greater than THR_vad, a decision submodule outputs a value used to indicate that the voice signal is effective, for example, outputs "1". The energy comparison process in the second phase is entered.

When the voice energy of the voice signals is calculated, a first voice signal with first duration may be obtained from the voice signals input into the microphones. Then, the first voice signal is sampled based on a specified sampling frequency. The voice energy of the voice signals input into the microphones is calculated based on the sampled signal. That the voice energy of the voice signals input into the microphones is calculated based on the sampled signal includes: An energy value of each sampling value included in the sampled signal is calculated, and an average value of the energy values of the sampling values is determined as the voice energy of the voice signals input into the microphone.

In the foregoing example, $E(x^2)$ may represent an average value of the voice energy of the voice signals, and may be replaced with an average energy value in a time period in an actual calculation process:

$$E(x^2) \approx \sum_{i=0}^{N-1} x^2(i)/N$$

The foregoing time period may be, for example, 20 ms, and N represents a quantity of sampling points for sampling a 20 ms voice signal. For example, if an audio sampling rate is 16 kHz, a value of N may be 320.

Phase 2: Voice Energy Comparison

After the submodule included in a voice activity detection module determines that the effective voice signal is input into each microphone, the voice energy comparison module is entered. The voice energy comparison module may determine, based on the voice energy of each voice signal, whether to wake up the electronic device. The voice energy comparison module may determine, based on a voice energy value difference or ratio between the voice signals or in another possible manner, whether a specified condition for waking up the electronic device is met. If the specified condition is met, the electronic device is woken up. In this embodiment, a specific implementation of determining, by using the energy value ratio between the voice signals, whether the voice signals meet the specified condition includes:

For voice signals $x_1$ (n) and $x_2$ (n) that are input into the top microphone and the bottom microphone, an energy value ratio between the voice signals input into the top microphone and the bottom microphone is calculated by using the following formula:

$$\text{RATIO}(x_1, x_2) = \begin{cases} 1, & \frac{E(x_1^2)}{E(x_2^2)} > THR \\ 1, & \frac{E(x_2^2)}{E(x_1^2)} > THR \\ 0, & \text{otherwise} \end{cases}$$

THR is a preset value, for example, may be set to 3. When a ratio of voice energy of the voice signal input into the top microphone to voice energy of the voice signal input into the bottom microphone is greater than THR, or a ratio of voice energy of the voice signal input into the bottom microphone to voice energy of the voice signal input into the top microphone is greater than THR, it is determined that the specified condition is met. In this case, the voice energy comparison module outputs a value used to indicate to wake up the electronic device, for example, outputs 1. It may be determined, based on the voice energy comparison module, whether a user speaks to the mobile phone at a short distance. In particular, when the user is close to one of the top microphone or the bottom microphone, the voice energy of the voice signals is significantly different. This complies with a use scenario in which the user holds the mobile phone and speaks to the top microphone or the bottom microphone. Therefore, in case of a specific speaking posture of the user, the mobile phone can be woken up in a wakeup-keyword-free manner.

It may be understood that, to implement the foregoing functions, the electronic device includes corresponding hardware and/or software modules for performing the functions. Steps in the examples described with reference to the embodiments disclosed in this specification can be implemented in this application in a form of hardware or a combination of hardware and computer software. Whether a function is performed by hardware or hardware driven by computer software depends on a particular application and a design constraint of the technical solutions. With reference to the embodiments, a person skilled in the art may use different methods to implement the described functions for each particular application.

In the embodiments, the electronic device may be divided into functional modules based on the foregoing method example. For example, each functional module may be obtained through division based on each function, or two or more functions may be integrated into one processing module. The integrated module may be implemented in a form of hardware. It should be noted that, in embodiments of this application, division into the modules is an example and is merely logical function division, and may be other division in an actual implementation.

Figure 6:
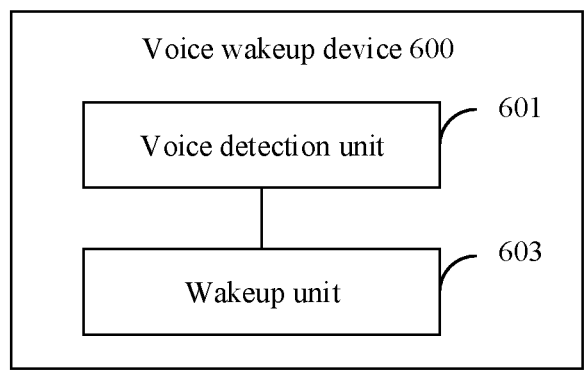
FIG. 6 is a schematic diagram of a structure of a voice wakeup device according to an embodiment of this application.

When each functional module is obtained through division based on each function, FIG. 6 is a schematic diagram of possible composition of the voice wakeup device in the foregoing embodiment. As shown in FIG. 6, a voice wakeup device 600 may include a voice detection unit 601 and a wakeup unit 603.

The voice detection unit 601 is configured to detect voice signals that are input into at least two microphones and that meet a first condition.

The wakeup unit 603 is configured to: determine, based on whether voice energy of the voice signals input into the at least two microphones meets a second condition, whether to wake up the electronic device; and if the voice energy meets the second condition, wake up the electronic device; or if the second condition is not met, continue to detect a voice signal input into the microphone.

In a possible implementation, locations of the at least two microphones are distributed in different areas of the electronic device.

In a possible implementation, the voice detection unit 601 is specifically configured to: calculate the voice energy of the voice signals input into the at least two microphones; and if the voice energy is greater than a first threshold, determine that the voice signals input into the at least two microphones meet the first condition.

In a possible implementation, the voice detection unit 601 is specifically configured to: obtain a first voice signal with first duration from the voice signals input into the at least two microphones, sample the first voice signal based on a preset sampling frequency, and calculate, based on the sampled signal, the voice energy of the voice signals input into the at least two microphones.

In a possible implementation, the voice detection unit 601 is specifically configured to: calculate an energy value of each sampling value included in the sampled signal, and determine an average value of the energy values of the sampling values as the voice energy of the voice signals input into the at least two microphones.

In a possible implementation, the wakeup unit 603 is specifically configured to: determine, based on an energy value difference between the voice signals, whether the voice energy of the voice signals input into the at least two microphones meets the second condition; or determine, based on an energy value ratio between the voice signals, whether the voice energy of the voice signals input into the at least two microphones meets the second condition.

In a possible implementation, the wakeup unit 603 is specifically configured to: if an energy value difference between a voice signal input into one of the at least two microphones and a voice signal input into a remaining microphone is greater than a second threshold, determine that the voice energy of the voice signals input into the at least two microphones meets the second condition.

In a possible implementation, the wakeup unit 603 is specifically configured to: if an energy value ratio between a voice signal input into one of the at least two microphones and a voice signal input into a remaining microphone is greater than a third threshold, determine that the voice energy of the voice signals input into the at least two microphones meets the second condition.

It should be understood that the electronic device herein is implemented in a form of a functional unit. The term "unit" herein may be implemented in a form of software and/or hardware. This is not specifically limited. For example, the "unit" may be a software program, a hardware circuit, or a combination thereof that implements the foregoing functions. The hardware unit may include an application specific integrated circuit (application specific integrated circuit, ASIC), an electronic circuit, a processor (for example, a shared processor, a dedicated processor, or a group processor) configured to execute one or more software or firmware programs, a memory, a merged logic circuit, and/or another appropriate component that supports the described function.

This application further provides a voice wakeup device. The device includes a storage medium and a central processing unit, the storage medium may be a non-volatile storage medium, the storage medium stores a computer executable program, and the central processing unit is connected to the non-volatile storage medium, and executes the computer executable program to implement the foregoing voice wakeup method.

This application further provides a computer-readable storage medium. The computer-readable storage medium stores instructions, and when the instructions are run on a computer, the computer is enabled to perform the steps in the voice wakeup method shown in FIG. 3 to FIG. 5.

This application further provides a computer program product that includes instructions. When the computer program product runs on a computer or at least one processor, the computer is enabled to perform the steps in the voice wakeup method shown in FIG. 3 to FIG. 5.

This application further provides a chip, including a processor and a data interface. The processor reads, through the data interface, instructions stored in a memory, to execute a corresponding operation and/or a corresponding procedure that are/is executed in the voice wakeup method provided in this application.

Optionally, the chip further includes a memory, the memory is connected to the processor by using a circuit or a wire, and the processor is configured to read and execute a computer program in the memory. Further, optionally, the chip further includes a communication interface, and the processor is connected to the communication interface. The communication interface is configured to receive data and/or information that needs to be processed, and the processor obtains the data and/or information from the communication interface, and processes the data and/or the information. The communication interface may be an input/output interface.

The memory may be a read-only memory (read-only memory, ROM) or another type of static storage device that can store static information and instructions, or a random access memory (random access memory, RAM) or another type of dynamic storage device that can store information and instructions, or may be an electrically erasable programmable read-only memory (electrically erasable programmable read-only memory, EEPROM), a compact disc read-only memory (compact disc read-only memory, CD-ROM) or another optical disk storage, an optical disc storage (including a compact disc, a laser disc, an optical disc, a digital versatile disc, a Blu-ray disc, or the like), a disk storage medium or another magnetic storage device, or any other medium that can be used to carry or store expected program code in a form of instructions or a data structure and that can be accessed by a computer.

In embodiments of this application, "at least one" means one or more, and "a plurality of" means two or more. The term "and/or" describes an association relationship for describing associated objects and represents that three relationships may exist. For example, A and/or B may represent the following three cases: Only A exists, both A and B exist, and only B exists. A and B may be in a singular or plural form. The character "/" usually indicates an "or" relationship between associated objects. "At least one of the following items (pieces)" or a similar expression thereof indicates any combination of these items, including a single item (piece) or any combination of a plurality of items (pieces). For example, at least one of a, b, and c may represent a, b, c, a-b, a-c, b-c, or a-b-c, where a, b, and c may be in a single or plural form.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In several embodiments provided in this application, when any function is implemented in a form of a software functional unit and sold or used as an independent product, the function may be stored on a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of embodiments of this application. Any variation or replacement readily figured out by a person skilled in the art within the technical scope disclosed in this application shall fall within the protection scope in embodiments of this application. Therefore, the protection scope of this application shall be subject to the protection scope of the claims.

What is claimed is:

1. A voice wakeup method, applied to an electronic device having a microphone, the method comprising:
    detecting voice signals that are input into at least two microphones and that meet a first condition; and
    determining, based on whether voice energy of the voice signals input into the at least two microphones meets a second condition, whether to wake up the electronic device; wherein if the second condition is met, waking up the electronic device; or if the second condition is not met, continuing to detect a voice signal input into the microphone.

2. The method according to claim 1, wherein locations of the at least two microphones are distributed in different areas of the electronic device.

3. The method according to claim 1, wherein determining whether the voice signals input into the at least two microphones meet the first condition comprises:
    calculating the voice energy of the voice signals input into the at least two microphones; and if the voice energy is greater than a first threshold, determining that the voice signals input into the at least two microphones meet the first condition.

4. The method according to claim 3, wherein the calculating the voice energy of the voice signals input into the at least two microphones comprises:

obtaining a first voice signal with a first duration from the voice signals input into the at least two microphones;

sampling the first voice signal based on a preset sampling frequency; and calculating, based on the sampled signal, the voice energy of the voice signals input into the at least two microphones.

5. The method according to claim 4, wherein the calculating, based on the sampled signal, the voice energy of the voice signals input into the at least two microphones comprises:

calculating an energy value of each sampling value in the sampled signal, and determining an average value of the energy values of the sampling values as the voice energy of the voice signals input into the at least two microphones.

6. The method according to claim 1, wherein determining whether the voice energy of the voice signals input into the at least two microphones meets the second condition comprises:

determining, based on an energy value difference between the voice signals, whether the voice energy of the voice signals input into the at least two microphones meets the second condition; or determining, based on an energy value ratio between the voice signals, whether the voice energy of the voice signals input into the at least two microphones meets the second condition.

7. The method according to claim 6, wherein the determining, based on the energy value difference between the voice signals, whether the voice energy of the voice signals input into the at least two microphones meets the second condition comprises:

if an energy value difference between a voice signal input into one of the at least two microphones and a voice signal input into a remaining microphone is greater than a second threshold, determining that the voice energy of the voice signals input into the at least two microphones meets the second condition.

8. The method according to claim 6, wherein the determining, based on the energy value ratio between the voice signals, whether the voice energy of the voice signals input into the at least two microphones meets the second condition comprises:

if an energy value ratio between a voice signal input into one of the at least two microphones and a voice signal input into a remaining microphone is greater than a third threshold, determining that the voice energy of the voice signals input into the at least two microphones meets the second condition.

9. An electronic device, comprising:

microphones, one or more processors, and a memory storing one or more computer instructions that, when the one or more computer instructions are executed by the one or more processors, cause the electronic device to perform the following steps:

detecting voice signals that are input into at least two microphones and that meet a first condition; and determining, based on whether voice energy of the voice signals input into the at least two microphones meets a second condition, whether to wake up the electronic device; wherein if the voice energy meets the second condition, waking up the electronic device; or if the second condition is not met, continuing to detect a voice signal input into the microphone.

10. The electronic device according to claim 9, wherein locations of the at least two microphones are distributed in different areas of the electronic device.

11. The electronic device according to claim 9, wherein the one or more computer instructions, when executed by the one or more processors, cause the electronic device to perform the following steps:

calculating the voice energy of the voice signals input into the at least two microphones; and if the voice energy is greater than a first threshold, determining that the voice signals input into the at least two microphones meet the first condition.

12. The electronic device according to claim 11, wherein the one or more computer instructions, when executed by the one or more processors, cause the electronic device to perform the following steps:

obtaining a first voice signal with a first duration from the voice signals input into the at least two microphones;

sampling the first voice signal based on a preset sampling frequency; and calculating, based on the sampled signal, the voice energy of the voice signals input into the at least two microphones.

13. The electronic device according to claim 12, wherein the one or more computer instructions, when executed by the one or more processors, cause the electronic device to perform the following steps:

calculating an energy value of each sampling value comprised in the sampled signal, and determining an average value of the energy values of the sampling values as the voice energy of the voice signals input into the at least two microphones.

14. The electronic device according to claim 9, wherein the one or more computer instructions, when executed by the one or more processors, cause the electronic device to perform the following steps:

determining, based on an energy value difference between the voice signals, whether the voice energy of the voice signals input into the at least two microphones meets the second condition; or determining, based on an energy value ratio between the voice signals, whether the voice energy of the voice signals input into the at least two microphones meets the second condition.

15. The electronic device according to claim 14, wherein the one or more computer instructions, when executed by the one or more processors, cause the electronic device perform the following step:

if an energy value difference between a voice signal input into one of the at least two microphones and a voice signal input into a remaining microphone is greater than a second threshold, determining that the voice energy of the voice signals input into the at least two microphones meets the second condition.

16. The device according to claim 14, wherein the one or more computer instructions, when executed by the one or more processors, cause the electronic device to perform the following step:

if an energy value ratio between a voice signal input into one of the at least two microphones and a voice signal input into a remaining microphone is greater than a third threshold, determining that the voice energy of the voice signals input into the at least two microphones meets the second condition.

17. A non-transitory computer readable medium, comprising computer instructions that, when run on an electronic device, cause the electronic device to:

detect voice signals that are input into at least two microphones and that meet a first condition; and determine, based on whether voice energy of the voice signals input into the at least two microphones meets a second condition, whether to wake up the electronic device; wherein if the voice energy meets the second condition, waking up the electronic device; or if the second condition is not met, continue to detect a voice signal input into the microphone.

18. The non-transitory computer readable medium according to claim 17, wherein locations of the at least two microphones are distributed in different areas of the electronic device.

19. The non-transitory computer readable medium according to claim 17, wherein the computer instructions, when run on the electronic device, cause the electronic device to:

calculate the voice energy of the voice signals input into the at least two microphones; and if the voice energy is greater than a first threshold, determine that the voice signals input into the at least two microphones meet the first condition.

20. The non-transitory computer readable medium according to claim 19, wherein the computer instructions, when run on the electronic device, cause the electronic device to:

obtain a first voice signal with a first duration from the voice signals input into the at least two microphones;

sample the first voice signal based on a preset sampling frequency; and calculate, based on the sampled signal, the voice energy of the voice signals input into the at least two microphones.

* * * * *